Aug. 29, 1967    B. E. NILSSON    3,339,030
CORD WINDING STRUCTURE
Filed April 22, 1964    2 Sheets-Sheet 1
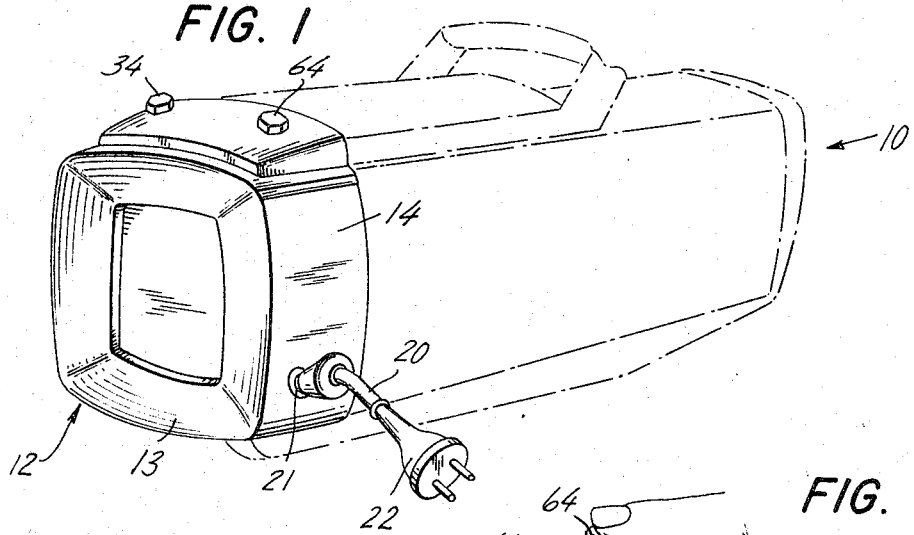
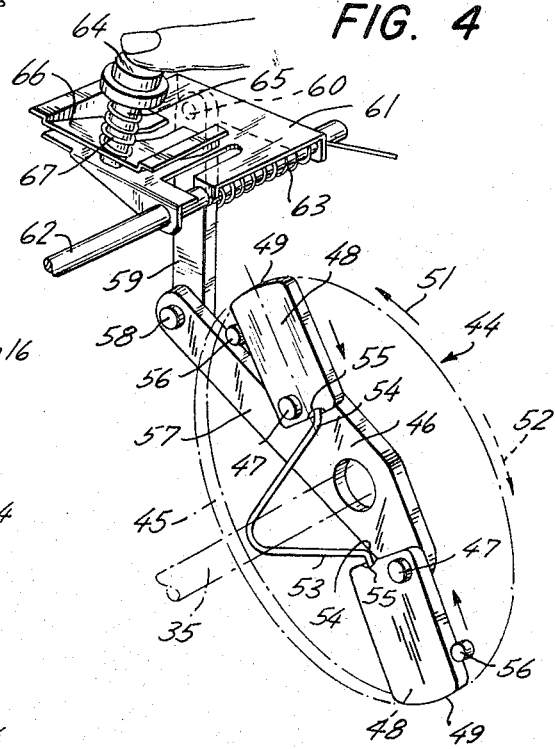
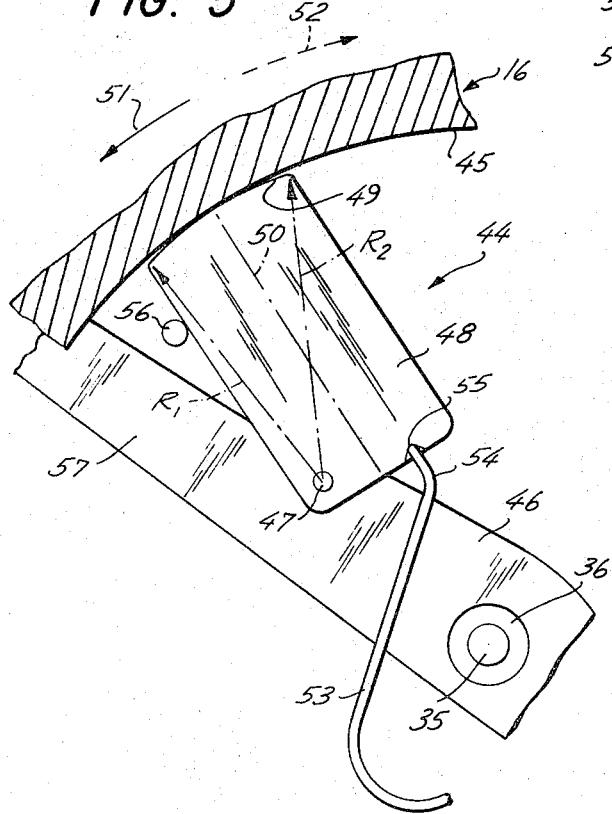
INVENTOR
Bengt Erik Nilsson
BY
ATTORNEY

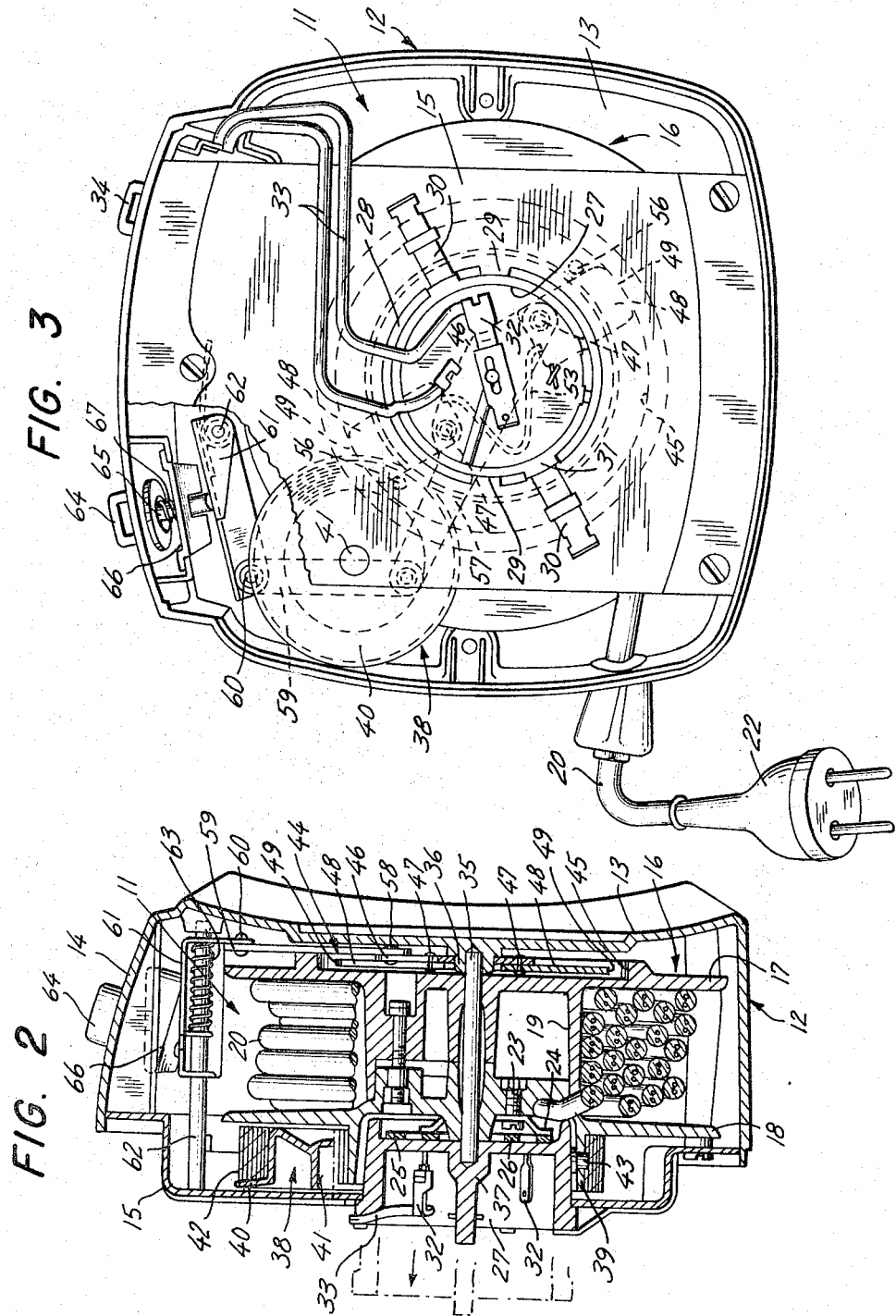

United States Patent Office 3,339,030
Patented Aug. 29, 1967

3,339,030
CORD WINDING STRUCTURE
Bengt Erik Nilsson, Hagersten, Sweden, assignor to Aktiebolaget Electrolux, Stockholm, Sweden, a corporation of Sweden
Filed Apr. 22, 1964, Ser. No. 361,695
Claims priority, application Sweden, Apr. 23, 1963, 4,460/63
10 Claims. (Cl. 191—12.2)

This invention relates to cordwinders, and more particularly to cordwinders for electrical appliances of the type that are movable over a floor or rug surface, for example, vacuum cleaners and the like.

A cordwinder for an electrical appliance of the type indicated above usually includes a reel mounted rotatably within the housing of the appliance and having wound thereon the electric cord by which current is supplied to the motor of the appliance, such cord extending out of the housing so that, when the cord is withdrawn from the housing, unwinding of the cord from the reel effects rotation of the latter in one direction, and spring drive means urging the reel to rotate in the opposite direction so that the cord previously withdrawn from the housing is rewound on the reel after its release.

It is an object of this invention to provide a cordwinder of the described character with an improved braking device which is normally operative to resist rewinding of the cord on the reel after a length of the cord has been withdrawn from the housing, and which can be conveniently released to permit rotation of the reel by the spring drive means for rewinding the cord on the reel.

Another object is to provide a braking device for a cordwinder which is operative to hold the reel of the latter against rotation in the cord-rewinding direction at any rotational position of the reel.

A further object is to provide a braking device for a cordwinder in which, when the braking device is engaged to frictionally resist rotation of the reel in the cord-rewinding direction, the tendency of the spring drive means to rotate the reel in that direction serves to increase the frictional resistance of the braking device to such rotation.

In accordance with an aspect of this invention, a braking device for a cordwinder of the described character comprises means on the reel defining a radially inward facing, annular drum surface concentric with the axis of rotation of the reel, a bridge member turnable about the axis of rotation, brake members mounted on the bridge member for rocking relative to the latter about axes radially removed from the axis of rotation, each of the brake members having a braking surface moved into frictional engagement with the drum surface to resist rotation of the reel in the cord rewinding direction upon rocking of the brake member relative to the bridge member in the cord rewinding direction, spring means carried by the bridge member for urging each of the brake members to rock about its radially removed axis relative to the bridge member in the cord rewinding direction, and stationary stop members which are engageable by the brake members upon turning of the bridge member in the cord rewinding direction to cause rocking of the brake members about their radially removed axes relative to the bridge members in the direction corresponding to that for unwinding of the cord from the reel, thereby freeing the braking surfaces from the drum surface and permitting rewinding of the cord on the reel.

In accordance with another feature of this invention, the radial distance measured from the rocking axis of each brake member on the bridge member to the braking surface of the brake member increases in the direction along the braking surface corresponding to the direction of rotation of the reel for unwinding of the cord therefrom so that, when the braking surfaces are frictionally engaged with the drum surface, the tendency of the spring drive means to rotate the reel in the cord rewinding direction serves merely to increase the frictional resistance of the braking device to such rotation of the reel.

The above, and other objects, features and advantages of this invention, will be apparent in the following detailed description of an illustrative embodiment thereof which is to be read in connection with the accompanying drawings forming a part hereof, and wherein:

FIG. 1 is a perspective view of the rear cover of a household vacuum cleaner of the horizontal type which is otherwise shown in broken lines, and which is provided with a cordwinder located in the rear cover and having a braking device in accordance with this invention;

FIG. 2 is a sectional view taken along the vertical medial plane of the rear cover;

FIG. 3 is an elevational view of the rear cover containing the cordwinder, as viewed from the front thereof;

FIG. 4 is a further enlarged, schematic perspective view illustrating the braking device in accordance with the invention; and FIG. 5 is an enlarged detail view of one of the brake members of the braking device.

Referring to the drawings in detail, and initially to FIG. 1 thereof, it will be seen that the illustrated vacuum cleaner of the horizontal type shown in broken lines at 10 on FIG. 1 has a removable rear end cover 12 shaped to define a rear end wall 13 and a peripheral flange or wall 14 directed forwardly from the sides, top and bottom of end wall 13. A bearing bracket or front wall 15 extends between the top and bottom portions of peripheral wall 14 adjacent the forward edge of the latter (FIGS. 2 and 3). A cordwinder embodying this invention and generally identified by the reference numeral 11 is mounted within rear end cover 12 between end wall 13 and bracket 15.

As shown particularly on FIG. 2, the cordwinder 11 includes a reel 16 having two circular side walls or flanges 17 and 18 and a substantially cylindrical barrel or hub 19 extending between the flanges, and on which an electric cord 20 can be wound. One end of the electric cord 20 extends out of rear cover 12 through an opening 21 in the side of the latter, and such end of the electric cord carries the usual plug 22 for engagement in an electrical outlet or receptacle. The other or inner end of electric cord 20 has its two wires firmly anchored or secured to reel 16 by means of contact screws 23 (only one of which appears on FIG. 2) extending through the central portion of side wall 18. The contact screws 23 further secure contact springs or brushes 24 to the side wall 18 of the reel. The contact springs or brushes 24 are intended to slidably engage concentric slip rings 25 and 26 carried by a cup-shaped member 27 removably secured in an opening 28 of the front bracket or wall 15.

In order to removably secure the member 27 in opening 28, the bracket 15 may be provided with tabs 29 (FIG. 3) projecting radially inward at diametrically opposed locations along the edge of opening 28 and being engageable in L-shaped or bayonet grooves (not shown) formed in the outer circumferential surface of cup-shaped member 27. Thus, when installing member 27 in bracket 15, the cup-shaped member 27 is initially inserted axially in the rearward direction in opening 28 and then turned to dispose the tabs 29 in the circumferentially extending portions of the grooves. The member 27 may then be locked against inadvertent removal from opening 28 of bracket 15 by means of slides 30 (FIG. 3) mounted on bracket 15 and movable radially inward beyond the edge of opening 28 to engage in corresponding notches 31 formed in the front edge surface of cup-shaped member 27, thereby to hold the latter against turning relative to bracket 15.

Connectors 32 are provided in the cup-shaped member 27 for electrically connecting slip rings 25 and 26 to conductors 33 which extend to the usual manually actuated switch 34 provided on the top of the rear end cover 12 for controlling energization of the motor of the electrical appliance by current supplied thereto through the cord 20. As well known in the art, the slip rings 25 and 26 are insulated from one another and from the cup-shaped member 27 in any suitable manner (not shown). Also, the contact springs or brushes 24 are mounted on the reel 18 by the contact screws 23 in any suitable manner (not shown) to provide electrical connections which function to conduct electrical energy from the two wires of the electric cord 20 through the contact springs or brushes 24, slip rings 25 and 26, conductors 33 and switch 34 to the motor of the electrical appliance.

As shown particularly on FIG. 2, the reel 16 is rotatable on a shaft 35 having its back end supported in a central boss 36 formed on end wall 13 while the front end of shaft 35 is supported in a central seat 37 formed in the cup-shaped member 27. It will be apparent that, upon removal of cup-shaped member 27 from opening 28 of bracket 15, contact springs 24 and contact screws 23 of reel 16 are readily accessible for convenient repair of the means by which the cord 20 is secured on the reel 16 and of the means for electrically connecting the cord with the fixed conductors 33 extending to the switch 34.

It will be apparent that, when electric cord 20 is withdrawn from the housing or rear end cover 12 through the opening 21 of the latter, the cord is unwound from the reel 16 and the latter is rotated in one direction, that is, in the clockwise direction as viewed on FIG. 3. In order to effect rewinding of the cord 20 on the reel, the reel 16 is provided with a spring drive device 38 yieldably urging the reel 16 to turn in the counter-clockwise direction. The spring drive device 38 is preferably of a known type operative to impart a substantially constant turning moment to the reel 16 without regard to the extent to which the cord 20 has been unwound from the reel. As shown generally on FIGS. 2 and 3 of the drawings, the spring drive device 38 of known type includes an axially directed flange 39 projecting from side wall 18 of reel 16 and extending around cup-shaped member 27 to define a first pulley. A second or spring storage pulley 40 is rotatable on a stud 41 projecting from bracket 15 and located so that the periphery of pulley 40 is closely adjacent to the periphery of pulley 39 on reel 16. An elongated flat spring 42 of constant-torque type is spirally wound on pulley 40 and has its outer end extended and anchored, at 43, to pulley 39 of the reel. The constant-torque spring 42 may be of the type that is commercially available under the trademark "Neg-ator."

When the pulley 39 is rotated with the reel 16, as when the electric cord 20 is being unwound from the reel, successive portions of the spring 42 are transferred from storage pulley 40 to pulley 39. During the imparting of such movement to the spring 42, the spring initially moves in an essentially straight path from pulley 40 to pulley 39 and is then bent backwards about the latter. The spring 42, which is prestressed to coil tightly about the storage pulley 40, possesses such physical properties that, during rotation of the pulley 39 with the reel 16, the parts of the spring already transferred to the pulley 39 do not undergo any change in stress, while the parts of the spring on the storage pulley 40 are substantially unstressed. Only that part of the spring 42 moving through the region or zone between the pulleys is subject to and undergoes a change in stress.

Due to the above described physical property inherent in the spring 42, successive longitudinal portions of the spring, during winding or unwinding, are progressively stressed incrementally in a substantially non-cumulative manner and produce a substantially constant torque tending to turn pulley 39 and reel 16 in the direction for rewinding cord 20 on the latter.

When the cord 20 is pulled to unwind it from the reel 16, rotation of the latter causes transfer of the spring 42 from pulley 40 to pulley 39 and the reverse winding of the spring on the latter. When the cord 20 is subsequently released, and assuming that the reel 16 is free to rotate in the rewinding direction, that is, in the counter-clockwise direction as viewed on FIG. 3, spring 42 is transferred from pulley 39 back onto pulley 40. Although the extended end of the spring 42 is fixed, at 43, to pulley 39, the inner end of the spring is not attached to storage pulley 40 which is, in turn, freely rotatable on the stud 41.

In accordance with the present invention, the cord-winder 11 further has a braking device 44 which is operative to hold reel 16 against rotation in the rewinding direction, that is, in the direction in which the reel is urged by spring drive device 38, after a selected length of electric cord 20 has been unwound from the reel. The braking device 44 generally comprises an annular ridge on side wall 17 of reel 16 defining a radially inward facing, annular drum surface 45 (FIG. 2) which is concentric with the axis of rotation of the reel. A bridge member 46 is turnable on the boss 36, that is, mounted for turning movement about shaft 35 which defines the axis of rotation of reel 16, and carries a pair of pivot pins 47 radially removed and spaced equally from shaft 35 at diametrically opposed sides of the latter. A brake member 48 is mounted on each of the radially removed pivot pins 47 for rocking relative to bridge member 46.

As shown particularly on FIG. 5, each of the brake members 48 is generally in the form of a radially extended, rectangular block having an arcuate outer end surface 49 constituting a braking surface that is engageable with drum surface 45 of reel 16. The braking surface 49 is symmetrical with the medial plane 50 of the brake member 48 and is preferably the arc of a circle having its center lying in the plane 50 of symmetry of the brake member. However, the rocking axis of brake member 48 relative to bridge member 46, as defined by the pivot pin 47, is angularly offset or eccentrically located relative to the plane 50 of symmetry at the side of the latter extending in the direction of rotation of reel 16 for rewinding the cord thereon, as indicated by the arrow 51 on FIG. 5. Thus, the radial distance from the rocking axis or pivot pin 47 of brake member 48 to braking surface 49 thereof increases progressively in the direction along the braking surface corresponding to the direction of rotation of the reel 16 for the unwinding of the cord 20 therefrom, as indicated by the broken arrow 52 on FIG. 5. Preferably, such radial distance increases from the value $R_1$, which is smaller than the radial distance from pivot pin 47 to drum surface 45, to a value $R_2$ greater than the radial distance from pivot pin 47 to drum surface 45.

Thus, when each brake member 48 is rocked relative to bridge member 46 in the counter-clockwise direction, as viewed on FIG. 5, that is, in the direction of rotation of reel 16 for rewinding the cord on the latter, braking surface 49 is moved into frictional engagement with drum surface 45 to resist such rotation of the reel. On the other hand, when the brake member 48 is rocked relative to bridge member 46 in the clockwise direction, that is, in the direction for unwinding cord 20 from reel 16, braking surface 49 is freed from the drum surface 45 and thereby avoids resistance to turning of the reel.

The braking device 44 further includes spring means carried by the bridge member 46 for acting on brake members 48 and urging the latter to rock about their radially removed axes or pivot pins 47 relative to the bridge member 46 in the counter-clockwise direction, as viewed on FIGS. 4 and 5, that is, in the direction for moving braking surfaces 49 into frictional engagement with drum surface 45. Such spring means preferably is in the form of a bowed or bent spring wire 53 having oppositely directed ends 54 engaging in seats 55 formed in the inner ends of brake members 48 at locations offset from pivot pins 47.

Stationary stop members 56, for example, extending from the back end wall 13, are disposed at the sides of brake members 48 facing in the direction of rotation 51 of the reel for rewinding the cord on the latter. Thus, when bridge member 46 is turned in the direction 51, that is, in the counter-clockwise direction as viewed on FIGS. 4 and 5, the stationary stop members 56 are engaged by the brake members 48 and cause rocking of the latter relative to bridge member 46 in the clockwise direction, that is, in the direction for freeing braking surfaces 49 from drum surface 45.

An extension or arm 57 is directed radially outward from one end of bridge member 46 and, at its free end, is connected by a pin 58 to an upwardly extending link 59 (FIG. 4). The upper end of link 59 is connected by a pivot pin 60 to a lever 61 which is rockable on a shaft 62 secured at its opposite ends in back end wall 13 and in bracket 15 (FIG. 2). A helical torsion spring 63 extends around shaft 62 and urges lever 61 upwardly about the shaft. The resulting upward movement of link 59 causes turning of bridge member 46 in the clockwise direction, as viewed on FIGS. 4 and 5, that is, in the direction tending to carry brake members 48 away from the related stationary stop members 56.

A push-button 64 projects from the top of back end closure 12 and forms the head of a spindle 65 which is movably mounted in a holder 66 (FIGS. 3 and 4). The lower end of spindle 65 is engageable with the top of lever 61 at a location spaced from the shaft 62. A return spring 67 is provided on spindle 65 between holder 66 and push-button 64 so as to normally urge the push-button to an elevated position where the lower end of spindle 65 is spaced from lever 61. However, when push-button 64 is depressed, spindle 65 acts downwardly on lever 61 and the corresponding downward movement of link 59 causes turning of bridge member 46 in the direction of the arrow 51, that is, in the direction for effecting engagement of brake members 58 with stationary stop members 56.

The above described braking device 44 operates as follows:

During the withdrawal or unwinding of cord 20 from reel 16, drum surface 45 moves in the direction of arrow 52, that is, in the clockwise direction as viewed on FIGS. 4 and 5, so that its frictional engagement with braking surfaces 49 of brake members 48 tends to rock the latter in the clockwise direction about pivot pins 47, thereby tending to dispose opposite the drum surface those portions of the braking surfaces at the relatively small distance $R_1$ from the pivot pins 47. Thus, the braking device 44 interposes little or no frictional resistance to rotation of reel 16 in the direction for unwinding cord 20 therefrom.

After the selected length of the cord 20 has been unwound from the reel 16 and pulling on the cord is discontinued, spring drive device 38 tends to rotate reel 16 in the direction of the arrow 51, that is, in the direction for rewinding the cord on the reel. However, spring 53 urges brake members 48 to rock in the direction for engaging the braking surfaces 49 with drum surface 45, thereby to resist rotation of the reel by spring drive device 38. By reason of the frictional engagement of braking surfaces 49 with drum surface 45, the force exerted by spring drive device 38 and tending to turn reel 16 in the direction of the arrow 51, merely tends to rock brake members 48 in the counterclockwise direction, as viewed on FIGS. 4 and 5, so that relatively larger radius portions of the braking surfaces are engaged with the drum surface to more strongly resist turning of the reel in the rewinding direction.

When it is desired to rewind the withdrawn length of the cord 20 on reel 16, push-button 64 is manually depressed against the force of the return spring 67, thereby rocking lever 61 in the downward direction, and through link 59, causing turning of bridge member 46 in the direction of the arrow 51. Upon such turning of the bridge member, stationary stop members 56 cause rocking of brake members 48 relative to bridge member 46 in the clockwise direction, that is, in the direction of the arrow 52, for freeing or releasing the braking surfaces 49 from drum surface 45. So long as push-button 64 is depressed, the braking surfaces 49 cannot effect strong frictional engagement with drum surface 45 so that reel 16 is then free to be turned by spring drive device 38 in the direction for rewinding the cord 20 thereon.

Although a particular embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention, except as defined in the appended claims.

I claim:

1. In a cordwinder having a reel which is rotated in one direction in response to the unwinding of an electric cord therefrom and which is continuously urged to rotate in the opposite direction for rewinding the cord on the reel; a braking device comprising means on the reel defining a radially inward facing, annular drum surface concentric with the axis of rotation of the reel, a bridge member, means for mounting said bridge member for turning movement about said reel axis, brake members mounted on said bridge member for rocking relative to the latter about axes radially removed from said axis of rotation of said reel, each of said brake members having a braking surface moved into frictional engagement with said drum surface to resist rotation of the reel in said opposite direction upon rocking of the brake member relative to the bridge member also in said opposite direction, spring means carried by said bridge member and turnable therewith for urging each of said brake members to rock about its radially removed axis relative to said bridge member in said opposite direction, and stationary stop members which are engageable by said brake members upon turning of said bridge members in said opposite direction to cause rocking of said brake members about their radially removed axes in said one direction relative to said bridge member for freeing said braking surfaces from said drum surface and thereby releasing said reel for rewinding of the cord thereon.

2. In a cordwinder, a braking device as in claim 1; further comprising a lever rockable about a fixed axis, means connecting said lever to said bridge member so that rocking of said lever causes similar turning of the bridge member, resilient means acting on said lever and urging the latter in the direction for turning said bridge member in said one direction so that said brake members are disengaged from said stop members, and thereby free to be rocked relative to said bridge member in said opposite direction, and a manually actuable member engageable with said lever to rock the latter in opposition to said resilient means acting on the lever, thereby to cause turning of said bridge member in said opposite direction.

3. In a cordwinder, a braking device as in claim 1; wherein the distance measured radially outward from the radially removed rocking axis of each brake member to said braking surface of the latter increases in the direction along said braking surface corresponding to said one direction of rotation of the reel so that the continuous urging of the reel to rotate in said opposite direction serves to increase the frictional resistance to rotation of the reel in said opposite direction when said braking surfaces are engaged with the drum surface.

4. In a cordwinder, a braking device as in claim 3; wherein said distance measured radially outward increases from a value less than the distance from said rocking axis to said drum surface to a value greater than the last mentioned distance.

5. In a cordwinder, a braking device as in claim 4; wherein said braking surface of each of said brake members is in the form of an arc of a circle having its center angularly offset with respect to the radially removed rocking axis of the related brake member.

6. In a cordwinder having a reel which is rotated in one direction by the unwinding of an electric cord therefrom and which is continuously urged to rotate in the opposite direction for rewinding the cord on the reel; a braking device comprising means on the reel defining a radially inward facing, annular drum surface concentric with the axis of rotation of the reel, a bridge member, means for mounting said bridge member for turning movement about said reel axis, a pair of substantially diametrically opposed brake members mounted on said bridge member for rocking relative to the latter about axis radially removed from said axis of rotation of said reel, each of said brake members having a braking surface moved into frictional engagement with said drum surface to resist rotation of the reel in said opposite direction upon rocking of said brake member relative to said bridge member in said opposite direction, said brake members having spring seats thereon spaced from the respective radially removed rocking axes, spring means carried by said bridge member and turnable therewith for engaging said spring seats of the braking members and urging the latter to rock relative to said bridge member in said opposite direction, and stationary stop members which are engageable by said brake members upon turning of said bridge member in said opposite direction to cause rocking of said brake members about their radially removed axes in said one direction relative to said bridge member for freeing said braking surfaces from said drum surface and thereby releasing said reel for rewinding of the cord thereon.

7. In a cordwinder, a braking device as in claim 6; wherein said spring means comprises an elongated, bowed spring member having its opposite ends engaging said spring seats of the brake members.

8. In a cordwinder; the combination of a shaft, a reel mounted on said shaft to rotate in one direction upon unwinding of an electric cord from the reel and which is continuously urged to rotate in the opposite direction for rewinding the cord on the reel, said reel having a radially inward facing annular shoulder at one end defining a drum surface, a bridge member, means for mounting said bridge member for turning movement on said shaft adjacent said one end of the reel, said bridge member having a pair of pivots radially removed from and spaced equally from said shaft at diametrically opposed sides of the latter, a brake member rockably mounted on each of said pivots and extending radially outward from the latter toward said drum surface, each brake member having an outer peripheral braking surface at a distance from the related pivot that increases, in the direction along said drum surface corresponding to said one direction of rotation of the reel, from a value less than the distance from said pivot to said drum surface to a value greater than the last mentioned distance, so that said braking surface is moved into increasingly strong frictional engagement with said drum surface upon rocking of each brake member relative to said bridge member in said opposite direction, spring means carried by said bridge member and turnable therewith for acting on said brake members and urging the latter to rock about their radially removed pivots relative to said bridge member in said opposite direction, stationary stop means which are engageable by said brake members upon turning of said bridge member in said opposite direction to cause rocking of said brake members about their radially removed pivots in said one direction relative to said bridge member for freeing said braking surfaces from said drum surface and thereby releasing said reel for rewinding of the cord thereon, and control means normally displacing said bridge member in said one direction so as to condition said brake members for resisting rotation of the reel in said opposite direction after unwinding of cord from the reel, said control means being manually actuable to turn said bridge member in said opposite direction and thereby permit said rewinding of the cord on the reel.

9. In an electrical appliance, the combination of a housing having two spaced apart walls, a cup-shaped member removably inserted in one of said walls, a shaft supported, at its opposite ends, in said cup-shaped member and in the other of said walls, a reel rotatably mounted on said shaft, an electric cord having one end secured to said reel and being wound on the latter to rotate the reel in one direction as the electric cord is withdrawn from said housing, means continuously urging said reel to rotate in the opposite direction for rewinding the withdrawn cord on the reel, contacts or brushes on the side of said reel facing said cup-shaped member, means for connecting said one end of the cord to said contacts for conducting current from said cord to said contacts, slip rings on said cup-shaped member engaged by said contacts for conducting current from said contacts to said slip rings, said reel having a radially inward facing shoulder at the side thereof facing said other wall to define an annular drum surface, a bridge member, means for mounting said bridge member for turning movement on said shaft between said reel and said other wall, brake members mounted on said bridge member for rocking relative to the latter about axes radially removed from said shaft, each of said brake members having a braking surface moved into frictional engagement with said drum surface to resist rotation of the reel in said opposite direction upon rocking of the brake member relative to the bridge member in said opposite direction, spring means carried by said bridge member and turnable therewith for urging said brake members to rock about their radially removed axes in said opposite direction relative to said bridge member, and stationary stop members which are engageable by said brake members upon turning of said bridge member in said opposite direction to cause rocking of said brake members about their radially removed axes in said one direction relative to said bridge member for freeing said braking surfaces from said drum surface and thereby releasing said reel for rewinding of the cord thereon.

10. In an electrical appliance, the combination as in claim 9; further comprising control means normally displacing said bridge member in said one direction so as to condition said brake members for resisting rotation of the reel in said opposite direction after withdrawal of a length of said cord from said housing, said control means including an actuating member exposed at the exterior of the housing and adapted for manual displacement to turn said bridge in said opposite direction and thereby permit rewinding of the withdrawn cord on the reel.

References Cited
UNITED STATES PATENTS

| | | | |
|---|---|---|---|
| 103,584 | 5/1870 | Dickinson | 188—82.7 X |
| 110,140 | 12/1870 | Jacob | 188—82.7 |
| 875,336 | 12/1907 | Evans | 188—82.7 |
| 1,208,537 | 12/1916 | Gemlo | 188—82.7 X |
| 1,288,511 | 12/1918 | Clarke | 191—12.2 |

(Other references on following page)

UNITED STATES PATENTS

| | | | |
|---|---|---|---|
| 1,763,953 | 6/1930 | Cohen | 191—12.2 X |
| 2,402,073 | 6/1946 | Newell | 188—82.7 X |
| 2,565,452 | 8/1951 | Johnson et al. | 191—12.2 X |
| 2,603,430 | 7/1952 | Hofer | 242—107.3 |
| 2,647,960 | 8/1953 | Benjamin | 191—12.4 |
| 2,825,087 | 3/1958 | Meyerhoefer | 15—323 |
| 3,137,883 | 6/1964 | Descarries | 15—323 |
| 3,182,139 | 5/1965 | Meletti | 191—12.4 |

FOREIGN PATENTS

| | | |
|---|---|---|
| 434,636 | 12/1911 | France. |
| 1,217,563 | 12/1959 | France. |
| 815,740 | 7/1959 | Great Britain. |
| 55,492 | 3/1891 | Germany. |

ARTHUR L. LA POINT, *Primary Examiner.*

STANLEY T. KRAWCZEWICZ, *Examiner.*